United States Patent [19]

Yopp et al.

[11] Patent Number: 4,822,063
[45] Date of Patent: Apr. 18, 1989

[54] AUTOMOTIVE SUSPENSION CONTROL SYSTEM INCLUDING SUSPENSION POSITION SENSOR

[75] Inventors: W. Trent Yopp, Canton; John A. Glab, Taylor, both of Mich.

[73] Assignee: Ford Motor Company, Dearborn, Mich.

[21] Appl. No.: 126,082

[22] Filed: Nov. 27, 1987

[51] Int. Cl.⁴ .............................................. B62D 37/00
[52] U.S. Cl. .................................... 280/840; 280/707; 280/DIG. 1
[58] Field of Search .......... 280/6 R, 6.1, 707, DIG. 1

[56] References Cited

U.S. PATENT DOCUMENTS

| | | | |
|---|---|---|---|
| 3,473,109 | 10/1969 | Maaz et al. | 324/34 |
| 4,105,216 | 8/1978 | Graham et al. | 280/6 R |
| 4,107,604 | 8/1978 | Bernier | 324/208 |
| 4,168,840 | 9/1979 | Graham | 280/6 R |
| 4,204,158 | 5/1980 | Ricouard et al. | 324/208 |
| 4,349,735 | 9/1982 | Maeda | 280/6 R |
| 4,364,574 | 12/1982 | Saito | 280/6 R |
| 4,433,849 | 2/1984 | Ohmori | 280/6 R |
| 4,453,725 | 6/1984 | Kuwana et al. | 280/6 R |
| 4,555,120 | 11/1985 | Frait et al. | 280/DIG. 1 |
| 4,718,683 | 1/1988 | Perga | 280/6 R |

FOREIGN PATENT DOCUMENTS 122210  7/1983  Japan .............................. 280/DIG. 1

Primary Examiner—Charles A. Marmor
Assistant Examiner—Ross Weaver
Attorney, Agent, or Firm—Jerome R. Drouillard; Roger L. May

[57] ABSTRACT

A sensor for determining the operational position of an automotive suspension including two members relatively movable with respect to one another includes an assembly with the first component movable with respect to a second component, with the first and second components being relatively movable with respect to each other as a result of the movement of the vehicle suspension. A sensor according to this invention will further include, without limitation, a signal generation device associated with said first and second sensor components for generating a plurality of position signals including both unique and non-unique signals.

20 Claims, 5 Drawing Sheets

AUTOMOTIVE SUSPENSION CONTROL SYSTEM INCLUDING SUSPENSION POSITION SENSOR

BACKGROUND OF THE INVENTION

1. Field of the Invention

This invention relates to an automotive suspension control system including a suspension position sensor.

2. Disclosure Information

Automotive suspensions employing adjustable suspension units typically utilize one or more sensors for detecting the position of one or more portions of the suspension with respect to either another part of the suspension itself or another part of the chassis of the vehicle. In the case of vehicles using load leveling or air or hydropneumatic suspension systems, it is necessary to know the ride height of the vehicle in order to determine whether correction of the ride height is required. In the event, for example, that the ride height is less than prescribed limits, as determined by the height sensor, an adjustable suspension unit may be given the command to increase the ride height. Conversely, in the event that the ride height exceeds the prescribed limits, the adjustable suspension unit may be given the command to lower, or decrease, the ride height.

Vehicular height sensors are useful not only with ride height adjusting systems but also as transducers for use with adjustable suspension dampers. A sensor according to the present invention is useful for providing not only suspension motion information but also ride height information for use with a vehicle leveling system or an air or hydropneumatic adjustable suspension or other type of adjustable suspension system.

U.S. Pat. No. 4,105,216 discloses a motor vehicle level control circuit in which a pair of optical detectors interacts with a rotary shutter device to produce a first logic signal pair when the vehicle's ride height is in a trim region, and second and third logic signal pairs when the vehicle's ride height is either high or low but out of the trim region. The system of the '216 patent has the capability of producing only three logic signal pairs with the two detector devices. A sensor according to the present invention, however, will have the capability to produce, with only two detector devices, four logic signal pairs defining a total of seven ride height states which correspond to seven states of the height sensor.

U.S. Pat. No. 4,453,725 discloses a rotary height sensor using a bifurcated shutter and three optical devices in order to produce a sensor having resolution of vehicle position into five possible levels. Note that the system of the '725 patent requires three optical devices and corresponding logic circuits in order to produce resolution to five states.

U.S. Pat. No. 4,433,849 discloses a vehicle leveling system having two reference vehicle height positions requiring separate detectors for each reference vehicle ride height position.

A variety of sensing techniques have been employed with vehicular height sensors. These include, without limitation, electro-optical devices, linear variable differential transformers, and Hall Effect devices. Examples of the latter are disclosed in U.S. Pat. Nos. 3,473,109; 4,107,604; 4,204,158; and 4,555,120. None of the sensors disclosed in these patents has the capability of providing multiple position signals including interspersed congruent and incongruent logic states from a plurality of detectors.

It is an object of the present invention to provide a height sensor capable of accommodating a plurality of reference vehicle ride height positions with a single height sensor containing only two detectors.

It is another object of the present invention to provide a height sensor and suspension control system which may be employed to produce a plurality of controlled ride heights.

It is another object of the present invention to provide a method for assuring that a parked vehicle does not become lodged upon an obstruction situated under the vehicle.

It is another object of the present invention to provide a suspension position sensor which furnishes more information than prior art sensors having the a similar level of detection capability.

Other objects, features and advantages of the present invention will become apparent to the reader.

SUMMARY OF THE INVENTION

According to the present invention, a sensor for determining the operational position of an automotive suspension including two suspension members relatively movable with respect to one another comprises an assembly including a first sensor component movable with respect to a second sensor component, and means for attaching the first sensor component to one of the relatively movable suspension members and the second sensor component to the other of the relatively movable suspension members such that the first and second sensor components will be caused to move with respect to one another when the suspension members move with respect to one another. A sensor according to this invention further comprises signal generation means associated with the first and second sensor components for generating a plurality of position signals including both unique and non-unique signals. The signal generation means preferably comprises magnet means carried by the first sensor component for generating a plurality of interrupted magnetic fields with the magnetic fields extending along a portion of the first sensor component, and detector means including a plurality of spaced apart detector devices carried by the second sensor component and responsive to the interrupted magnetic field for generating a position signal representative of the position between the two suspension members. Each detector device is constructed so as to generate a first logic signal at one level whenever the detector is in proximity to the field produced by the magnet means and a second logic signal at another level whenever the detector is in proximity to one of the field interruptions. The detector devices employed in a sensor according to this invention may comprise Hall Effect switches. The magnet means preferably comprises a plurality of magnets separated by a plurality of gaps corresponding to and causing a plurality of field interruptions. The position signal generated by the sensor will represent whether the relative position between the members is in any of: (1) a trim region; (2) a high region; (3) a low region; or (4) a plurality of marker regions lying within the high and low regions with the marker regions corresponding to the previously described field interruptions. A sensor according to this invention may further comprise a logic device for determining which of the regions the position signal represents. The logic device preferably includes means for altering the designations of the regions so as to enable a change of the stabilized ride height of a vehicle. Such means for altering the designations of the ride height regions will comprise means for producing at least one stabilized ride height either above or below the stabilized ride height associated with the trim region.

According to one facet of the present invention, a method for adjusting the ride height of a standing vehicle having an adjustable suspension unit, so as to prevent the vehicle's chassis from becoming lodged upon an obstruction under the vehicle comprises the steps of:

(1) sensing the initial ride height of a vehicle by means of a sensor for determining the operational position of the suspension;

(2) comparing the initial ride height to a predetermined ride height region;

(3) generating a signal in the event that the sensed ride height is above the predetermined region;

(4) directing the adjustable suspension unit to attempt to lower the vehicle to the predetermined region in response to the presence of said signal;

(5) continuously sensing the adjusted ride height of the vehicle while the suspension unit attempts to lower the vehicle;

(6) comparing the adjusted ride height to the predetermined region; and (7) redirecting the adjustable suspension unit to make no further correction of the ride height in the event that the adjusted ride height is within the predetermined region, but redirecting the suspension unit to raise the vehicle to a greater ride height in the event that the difference between the adjusted ride height and the predetermined region is not less than the difference between the initial ride height and the predetermined region. During the process of increasing the ride height, the suspension unit may be controlled by operating the suspension unit in a manner so as to increase the ride height for either a specified period of time, or alternatively, until the sensor determines that the ride height has increased. The aforementioned method may further comprise the step of redirecting the suspension unit to continue attempting to lower the vehicle in the event that the difference between the adjusted ride height and the predetermined region is less than the difference between the initial ride height and the predetermined region. The predetermined region is preferably a trim region of operation of a height sensor and suspension.

BRIEF DESCRIPTION OF THE DRAWINGS

FIG. 3 shows a plurality of magnets housed within the rotor and also shows the location of two detectors A and B with respect to said magnets for three different orientations of the height sensor.

DETAILED DESCRIPTION OF THE PREFERRED EMBODIMENTS

Figure 1:
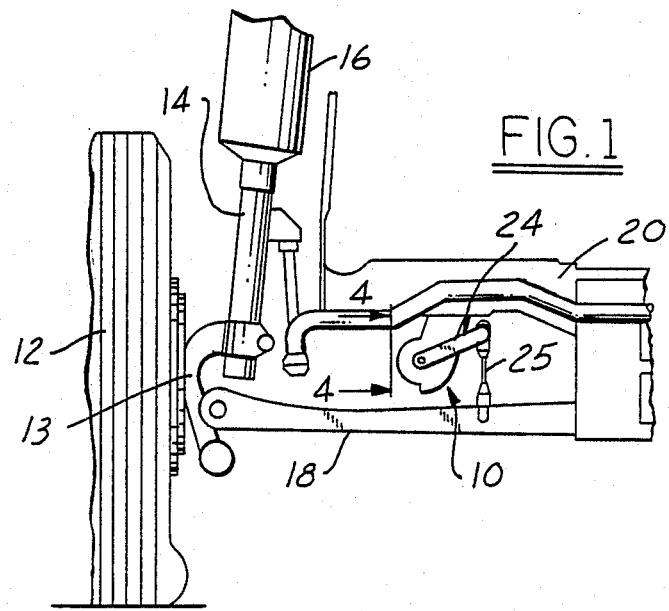
FIG. 1 is a frontal elevation of an automotive suspension equipped with a suspension position sensor according to the present invention.

As shown in FIG. 1, a height sensor assembly, 10, according to the present invention is intended for use with an automotive suspension including road wheel and tire assembly 12, telescoping strut 14, and suspension control arm 18. The upper portion of telescoping strut 14 is surrounded by ride height adjuster 16.

Road wheel and tire assembly 12 is rotatably mounted to wheel carrier 13. The lower end of telescoping strut 14 is rigidly mounted to wheel carrier 13, whereas the upper end of the telescoping strut extending above ride height adjuster 16, although not shown, is resiliently or pivotally attached to the chassis of the vehicle in conventional fashion. Those skilled in the art will appreciate in view of this disclosure that although the present system has been described in view of the well-known MacPherson strut, a height sensor according to the present invention could be utilized with a variety of suspension configurations including the modified MacPherson strut, Hotchkiss, quadralink, or other types of suspension configurations.

Figure 4:
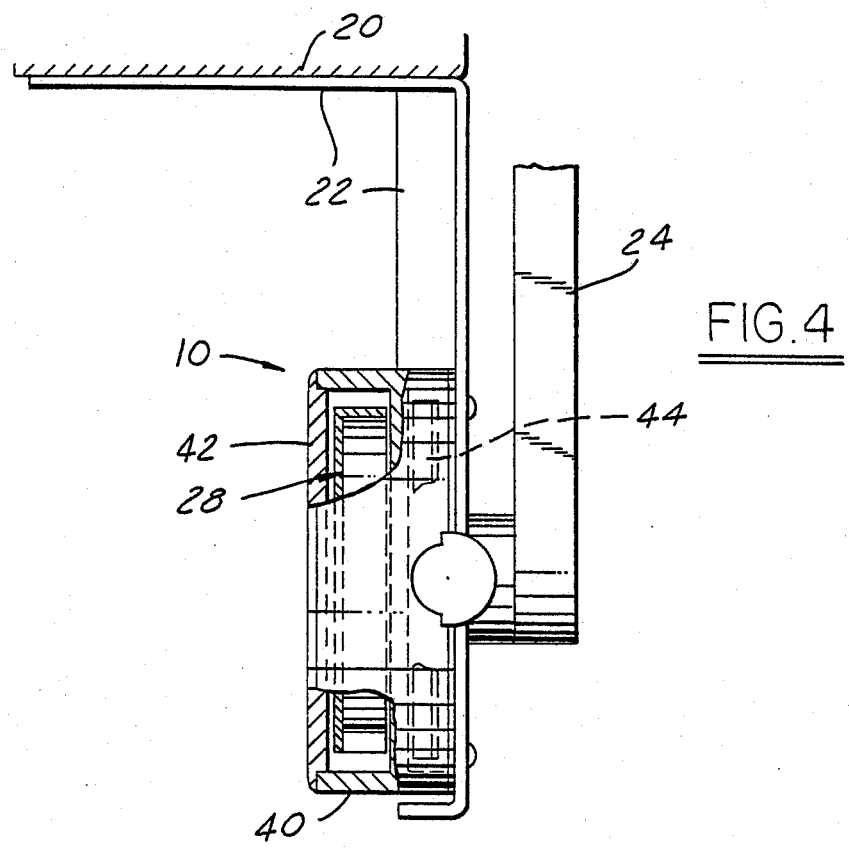
FIG. 4 is a partially broken away elevation of the sensor according to the present invention taken along the line 4—4 of FIG. 1.
Figure 2:
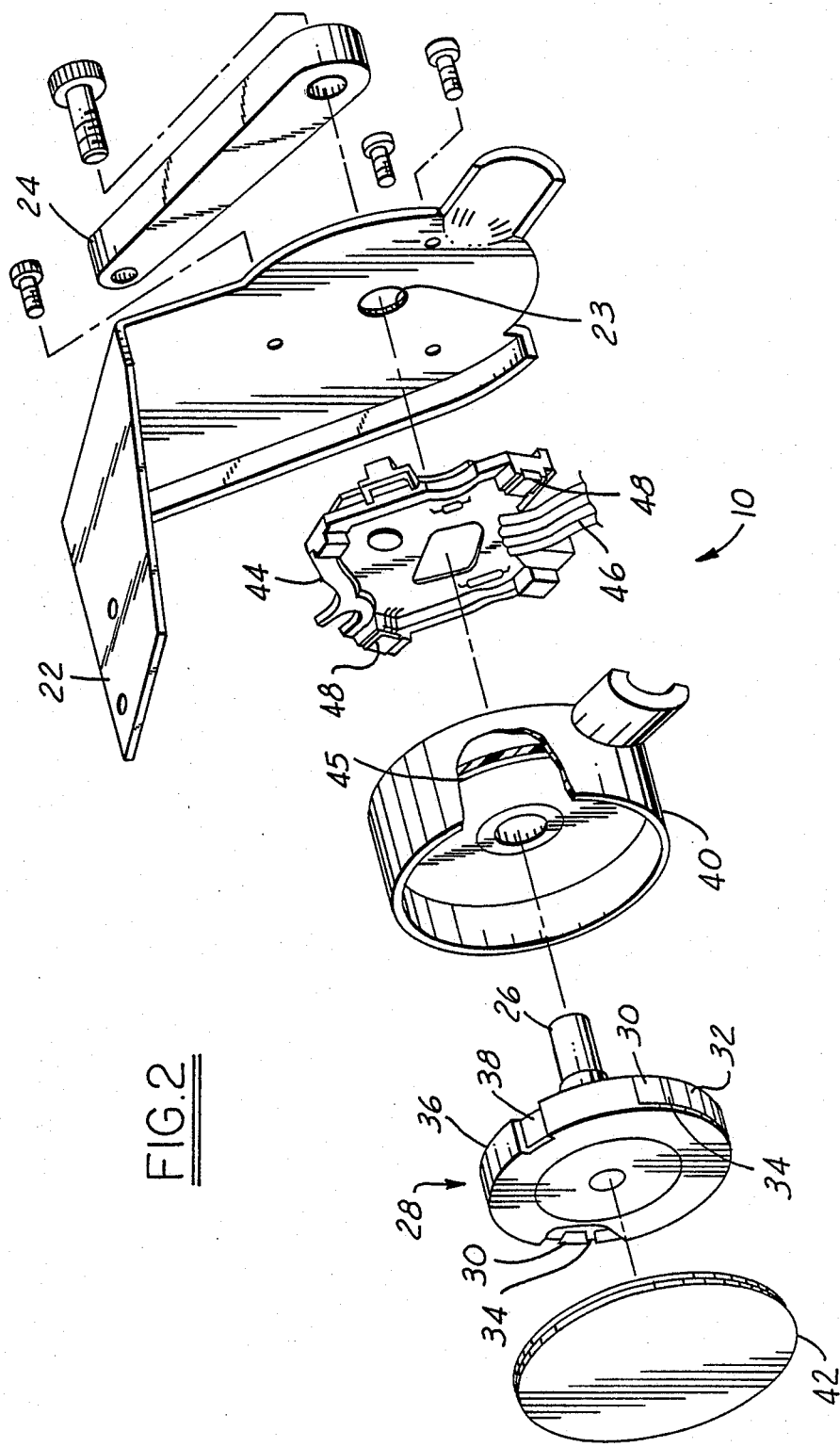
FIG. 2 is an exploded perspective view of the suspension position sensor shown in FIG. 1.

As shown with particularity in FIG. 4, height sensor assembly 10 is mounted by means of bracket 22 to vehicle chassis 20. Rotor 28 housed within the sensor (FIG. 2) is coupled with suspension control arm 18 by means of linkage arm 24 and connecting link 25 (FIG. 1). Accordingly, when the vehicle suspension moves vertically in jounce and rebound, linkage arm 24 and connecting link 25 will cause a translation of the corresponding vertical movement of suspension control arm 18 with respect to chassis 20 into rotary motion of rotor 28 which is attached to linkage arm 24 by means of shaft 26 (FIG. 2). Thus, it may be seen that the vertical position of the vehicle's road wheel and tire assembly, as well as the connected suspension componentry, is uniquely related to a rotary position of rotor 28. The position of the rotor is output by height sensor assembly 10 according to the waveforms shown in FIGS. 5 and 6.

Certain details of construction of a height sensor according to present invention are shown in FIG. 2. The function of mounting bracket 22 has been described previously, but to reiterate, the mounting bracket serves to attach sensor housing 40 to an automotive suspension member which is relatively movable with respect to another suspension member. Thus, although mounting bracket 22 is shown as being attached to chassis 20 in FIG. 1, the mounting bracket and sensor housing could equally well be mounted upon suspension control arm 18 or some other suspension member relatively movable with respect to another such suspension member. Mounting bracket 22 contains an aperture 23 through which shaft 26 passes. Shaft 26 is attached to linkage arm 24, which is shown as being attached ultimately to suspension control arm 18 by connecting link 25.

Figure 3:
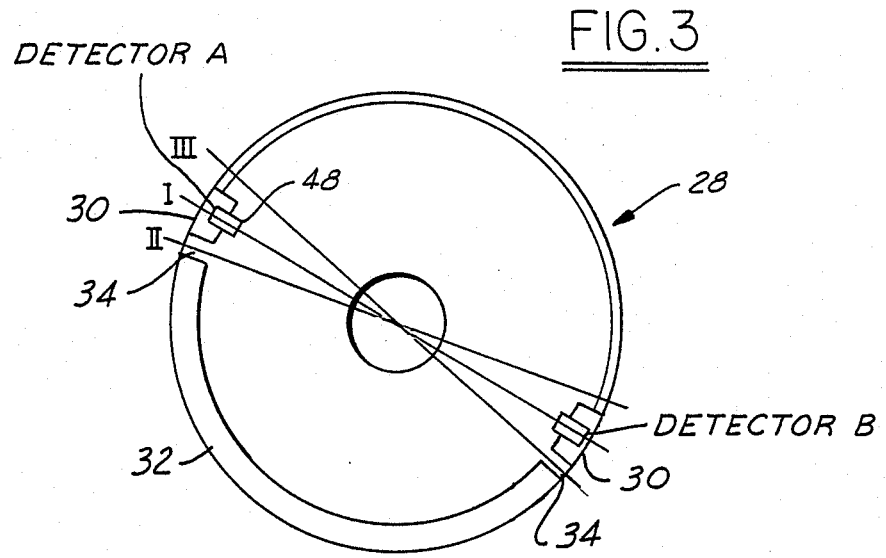
FIG. 3 is a partially schematic representation of a rotor enclosed in the height sensor of FIGS. 1-2.

Rotor 28 comprises preform 36 which is filled with filler material 38, which is integral with and forms shaft 26 as well. Filler 38 and preform 36 may comprise a variety of materials such as various plastics or suitable metals. As shown with particularity in FIG. 3, rotor 28 comprises a plurality of magnets, and although FIG. 3 shows but three such magnets, those skilled in the art will appreciate in view of this disclosure that additional magnets having gaps therebetween could be employed for the purpose of producing a sensor according to the present invention but having different operational characteristics from those shown herein. FIG. 3 shows two air gaps 34 extending between two smaller magnets 30 and a single larger magnet, 32. These gaps could be filled by a spacer which may be constructed from a magnetic material such as soft steel or nonmagnetic material such as aluminum or brass. It should be noted that large magnet 32 comprises the only magnet extending between magnets 30.

Figure 7:
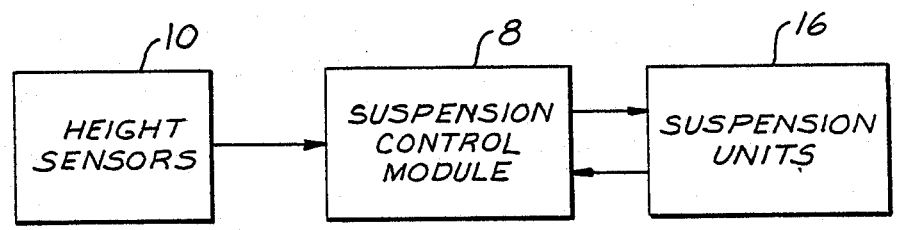
FIG. 7 contains a generalized system block diagram of a suspension control system including a height sensor according to the present invention.

In addition to rotor 26, circuit board 44 is contained within sensor housing 40 (FIG. 2). The circuit board holds several components needed for operation of the sensor with the most important being a pair of Hall switches 48. The circuit board, including the Hall switches, is separated from the rotor by a thin aluminum plate 45. The end of the sensor housing opposite mounting bracket 22 is closed by cover 42. A plurality of electronic leads 46, in this case amounting to four in number, is employed for the purpose of connecting height sensor 10 with suspension control module 8 (FIG. 7).

The principle of operation of Hall effect switches is well known to those in the art. The cooperation of Hall effect switches 48 and the magnets incorporated into rotor 28 produces the waveforms shown in FIGS. 5 and 6. As shown in FIG. 3, Hall switches 48 are arranged in positions which are disposed about sensor housing 40. When either of Hall switches 40 is positioned adjacent one of the magnets 30 or 32 included within rotor 28, the switch is in the "on" state and generates a low level logic signal. Conversely, when either of the switches is adjacent either one of the gaps 34 or the more lengthy portion of the rotor not occupied by a magnet which in effect comprises a rather large gap, the Hall switch will be in the "off" state and the output of the switch will be at a high logic level. Those skilled in the art will appreciate in view of this disclosure that other types of detector and exciter devices could be employed within a sensor according to the present invention. For example, magnetic reed switches, or electro-optical devices, or linear Hall Effect switches or other types of devices could be utilized.

Figure 5:
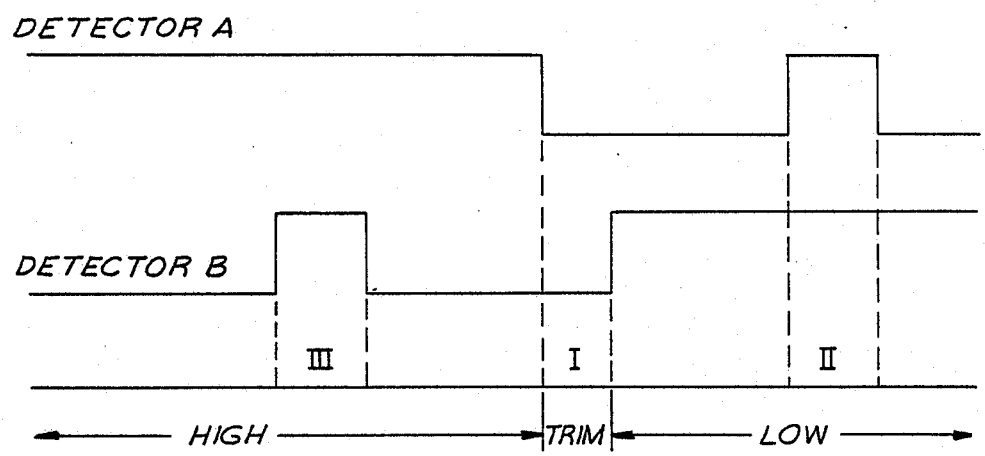
FIG. 5 shows an output waveform pattern for a sensor according to the present invention.

FIGS. 3 and 5 show three correlated positions and output waveforms for sensor assembly 10. When the sensor is in the trim region, which is labeled "I" in FIGS. 3 and 5, each Hall switch will be positioned in proximity to one of the small magnets. 30, with the result that the magnetic fields generated by the magnets will switch off the Hall devices bringing each switch to a low logic level shown in the trim region of FIG. 5. When the sensor assembly is rotated in either direction from the trim position, one of the Hall switches will first come into proximity with a gap 34. In the absence of a magnetic field, the Hall switch will turn off and thus will produce a high logic level on the appropriate outlet lead 46. If for example, the sensor is repositioned from the trim region shown in FIG. 5 to the low ride height position, Hall switch B of FIG. 3 will be positioned in proximity to a portion of rotor 28 not occupied by a magnet. Accordingly, detector B will move to a high logic level. In the event that the sensor assembly is rotated further in the low ride height direction to the point where the detectors are positioned vis-a-vis the magnets in the location shown by the numeral "II" in FIGS. 3 and 5, both detectors A and B will be positioned in proximity to a nonmagnetic portion of the rotor assembly. As a result, both detectors will be "off" and as a result the marker region shown as "II" in FIG. 5 will be produced. This marker region is very important because it enables the height sensor to detect movement within the low region of operation of the height sensor, and hence, the suspension. Conversely, the region of operation labeled as "III" in FIGS. 3 and 5 is characterized by both detectors again being in an "off", or high logic level state. This marker region results from detector B falling within a gap 34 between small magnet 30 and large magnet 32 of rotor 28. As before, marker region III enables sensor assembly 10 to detect movement of the suspension within the defined high state. This ability to detect movement within one of the defined states may be employed for the purpose of adjusting the ride height of the standing vehicle so as to prevent the vehicle's chassis from being lodged upon an obstruction under the vehicle. This method will be described below.

As noted above, the marker regions produced by a sensor according to the present invention are important because they enable the sensor to provide more information without the additional hardware normally associated with added channels of operation. However, because each marker region is identical, in terms of the sensor's output signal, to each other marker region, the control module must be provided with an algorithm for processing the sensor's signals which accommodates the non-unique marker regions. This is accomplished in the controller's software by simply disregarding the presence of the marker regions for those functions in which the marker regions could cause confusion. Thus, when a vehicle equipped with one or more sensors according to the present invention is running down a roadway, the sensor or sensors will usually provide data continuously regarding the ride height of the vehicle. These data will normally include readings corresponding to each of the regions of operation illustrated in FIG. 5. When a non-unique logic signal (i.e., a marker signal as typified by regions II and III in FIG. 5) is received during ride height monitoring, the controller's logic will disregard the signal and consider the most recently received unique signal in place of the non-unique signal. This practice is feasible in part because the size of the non-unique regions (regions II and III in FIG. 5) are smaller than the surrounding regions of operation.

Figure 6:
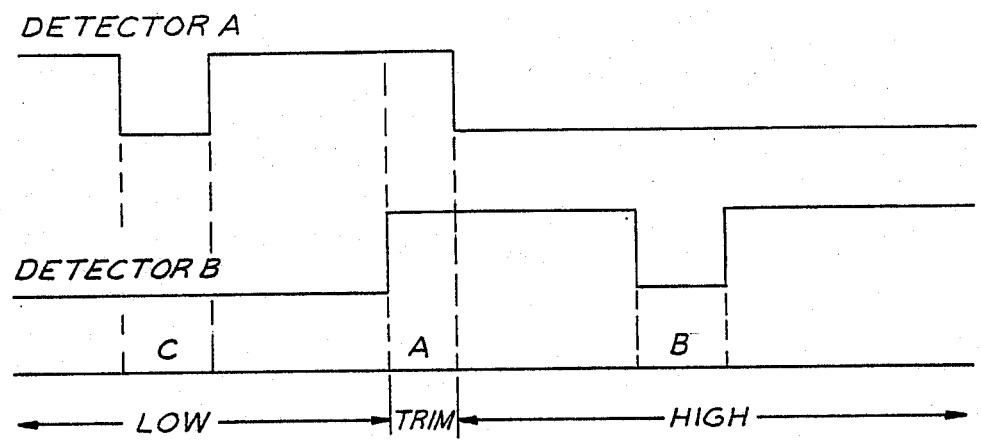
FIG. 6 shows a second output waveform pattern for a sensor according to the present invention.

FIG. 6 shows a second logic signal pattern resulting from a revision of the logic shown in FIG. 5. This inversion results from a re-positioning of the magnets incorporated into rotor 28. Accordingly, the trim state as shown in FIG. 6 as region A will be characterized by high logic level outputs from each of the detectors A and B. This result is advantageous because in the event that the conductors 46 to one or more height sensor assemblies 10 become detached, suspension control module 8 will read a spurious high logic level signal from each of the disconnected sensors. This will cause the control module to falsely assume that the disconnected sensors indicate the vehicle to be at a trim ride height level and the controller will accordingly make no further ride height corrections. Those skilled in the art will appreciate in view of this disclosure that it is desirable not to make any correction of the vehicle's ride height in the event that one or more height sensors are not operating properly. The dual high level signal default mode for the height sensor will allow the suspension control module to take sufficient data from all of the height sensors to ascertain that a problem exists and to take appropriate action which may comprise, for example, disabling the system from making any further corrections until remedial action has been taken. With the logic arrangement shown in FIG. 5, on the other hand, in the event that suspension control module 8 sees a high level logic output from a disconnected sensor, it may erroneously assume that the suspension is low and begin immediate, unneeded, corrective action to change ride height when no change is required. In order to obviate such a problem, the output of each sensor may be monitored by the control module whenever the vehicle is started and driven away and in the event that no signal other than a dual high level signal is received during an initial period of operation the computer will assume that any sensor transmitting such a signal is disconnected, and the control module will not act upon the data from such a sensor. This strategy is premised upon the assumption that a vehicle running at, for example, fifteen miles per hour for a finite period of time, for example, 4 minutes, will experience body motion sufficient to cause the height sensor's position to move from the relatively small marker regions to one of the adjoining regions of operation. If, however, the sensor has not transmitted a signal indicative of such body motion, it is a fair assumption that the sensor has become inoperative and should not be further relied upon.

Returning to FIG. 6, region B is readily identifiable as the marker segment within the high ride height region of operation of the sensor. As clearly seen from FIG. 6, region B is characterized by operation of each of detectors A and B at a low logic level. Similarly, marker segment C within the low region of operation of the sensor and suspension is characterized by low logic level operation of each of the sensor's detectors.

A height sensor according to the present invention may be employed with the suspension control module to produce a change of the stabilized ride height of a vehicle equipped with the sensor by altering the designations of the regions of operation of a height sensor and an associated suspension. More particularly, if a low stabilized ride height is required for reasons of aerodynamics or otherwise, the vehicle's ride height could be stabilized in the low region of operation shown in FIG. 5 extending between the states of operation labeled I and II. If this alteration of designation of the regions of operation is performed, region II could be re-characterized as the "low" ride height region, whereas region I could be re-characterized as the "high" ride height region. If, on the other hand, it is desired to operate the vehicle in a high ride height mode because a rough road has been encountered, the stabilized ride height could be set, for example, such that region I is the "low" region, with region III as the "high" region. This may be worked by changing the designations of the various regions of operation of the height sensor within the computer's control logic. Other modifications of ride height using the regions shown in FIGS. 5 and 6 will no doubt occur to those skilled in the at in view of this disclosure.

Figure 8:
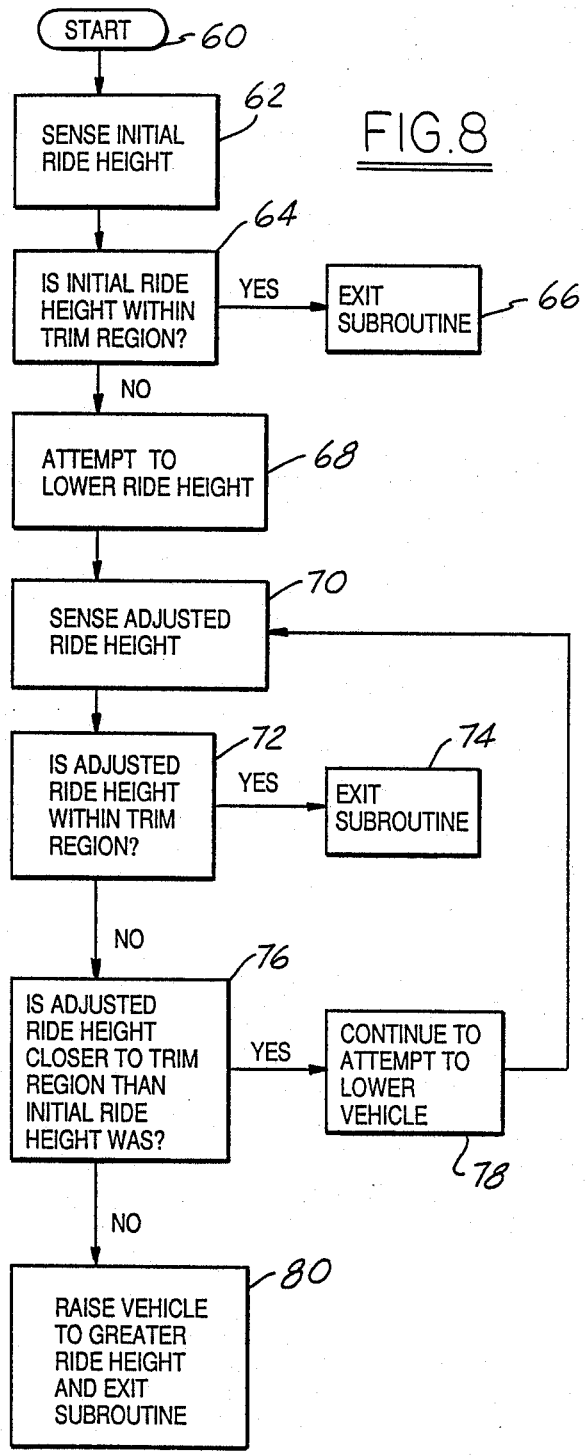
FIG. 8 is a logic flow diagram illustrating an obstacle avoidance subroutine for a standing vehicle which may be practiced by means of a sensor according to the present invention.

A height sensor and control module according to this invention may be employed for the purpose of adjusting the ride height of a standing vehicle so as to prevent the vehicle's chassis from becoming lodged upon an obstruction under the vehicle. Experienced motorists are aware of the possibility that a vehicle may be driven over an obstruction such as a parking lot bumper or a snow bank. Once this has happened, if the vehicle is lowered from the high ride height region to the trim region, the vehicle's chassis may become "hung up" upon the obstruction, and immobilization of the vehicle may occur. The steps of a method intended to avoid this problem are shown in FIG. 8.

The obstruction avoidance method according to the present invention begins at start block 60. At logic block 62 the computer senses the initial ride height of the vehicle. In this case, the term "computer" refers to a microprocessor device including input and output terminals; a readable, addressable memory (RAM); a central processor for reading and executing unit commands (CPU); and a read-only memory (ROM) for holding data permanently. The type 8797 microprocessor by Intel Corp. has been found to be useful for practicing the present invention.

Having measured the initial ride height at block 62, at block 64 the computer compares the sensed initial ride height to a predetermined ride height region, which is preferably a trim region. In the event that the ride height is within the trim region, the computer exits the subroutine at block 66 because no change in ride height is needed. In the event that the ride height is not within the limits of the region it is assumed to be high because the vehicle is presumably level within the trim region when the ignition switch is opened at the end of a period of vehicle operation. Accordingly, at block 68 the computer directs an adjustable suspension unit to attempt to lower the vehicle into a predetermined region which, as previously noted, will most likely be a trim region. This command at block 68 to attempt to lower the ride height is in response to a signal generated by the sensor and suspension control module in the event that the sensed ride height is above the predetermined desired region. After the adjustable suspension unit has attempted to lower the ride height, the adjusted ride height of the vehicle will be sensed once again and compared to the predetermined trim region. In the event that the ride height falls within the predetermined region after the adjustment attempt, the computer exits the subroutine at block 74, there being no further need for adjustment. If, on the other hand, the adjusted ride height is closer to the trim region than the initial ride height was, but is nevertheless not within the trim region, the computer at blocks 76 and 78 will direct the adjustable suspension unit to continue to attempt to lower the vehicle. Following this continued attempt, the adjusted height will be resensed and compared to the trim region. Those skilled in the art will appreciate in view of this disclosure that the number of iterations performed by this adjustment routine is a matter of design choice which must take into consideration such factors as the availability of a power source to operate the adjustable suspension units through such iterations and such other factors as the time response characteristics of the adjustable suspension units. Following the adjustment attempts, in the event that the difference between the adjusted ride height and predetermined trim region is not less than the difference between the initial ride height and the predetermined trim region, i.e., in the event that the vehicle's height has not been corrected by the adjustment attempt, the computer, at block 80, will give a command to the adjustable suspension unit to increase the vehicle's ride height to a higher level and to exit the subroutine. In practical terms, this last adjustment is made in recognition of the likelihood that the vehicle has become lodged upon an obstruction because it was not possible to lower the ride height by, for example, venting air from a adjustable pneumatic suspension unit. Increasing the final ride height will allow the vehicle to free itself from the obstruction. In practice, the suspension control unit will know that it has become dislodged from an obstacle once the suspension has moved into a ride height region extending above the region below which the vehicle was unable to move. In order to prevent the vehicle from becoming lodged upon the same obstacle when the vehicle is re-started, the ride height will preferably be maintained in the elevated position until the vehicle has moved either a specified distance, or at a specified velocity, or with a specified rate of acceleration. The occurrence of these or other events will assure that the vehicle has moved away from the obstacle so that a lowered ride height will not cause a problem.

With further reference to FIG. 5, upon movement of the ignition switch to the "off" position, in the event that the height sensor sees a high level signal, in other words that detector A is at a high level and detector B is at a lower level, or, even in the event that both detectors A and B are at a high level, the computer will give a signal to the adjustable suspension unit to lower the vehicle's ride height toward the trim region. In the event that the initial ride height was within the region between the trim region (region I) and the high marker region (region III), and in the event that the adjustment attempt is successful, the vehicle's ride height will move into the trim region, the sensor will detect the trim position, and no further commands will be issued. In a second example, if the initial ride height was within the position lying above region III, and if the attempt to decrease the ride height in the direction of the trim region was successful, the computer will first sense passage of the vehicle's ride height into marker region III. In this event, a further command will be given to continue the attempt to lower the ride height in the direction of the trim region. If this continued attempt results in movement of the ride height into trim region I, no further commands will be given. On the other hand, in the event that no change is sensed as a result of the further command, the computer will issue the command to increase the ride height until a high signal corresponding to the region of operation lying above region III is detected. Alternatively, a command could be given to operate the suspension unit, in a manner so as to increase ride height, for a specified period of time. For an air suspension unit, this could involve the pumping of compressed air into the unit for a fixed time period, which time could be a function of the particular region of operation of the suspension unit and height sensor. Finally, in the event that the computer senses a high condition at the time the ignition switch is turned off and if the attempt to decrease the ride height does not result in movement of the height sensor into a lower region of operation, the computer will issue a command to increase the ride height until a higher region of operation is sensed or until a specified period of time has elapsed. After such period has run, no further height adjustment will be attempted. In any event, the system will thus assure that the vehicle does not become lodged upon an obstruction such as a parking lot curb or snow bank upon which the vehicle has been driven. In a preferred embodiment, the foregoing obstruction avoidance method is allowed to continue operating for approximately one hour after the vehicle's ignition system is shut off. After such time has elapsed the control module will not make any further correction of ride height.

Variations and modifications of the present invention are possible without departing from its spirit and scope as defined by the appended claims.

I claim:

1. A sensor for determining the operational position of an automotive suspension including two suspension members relatively movable with respect to one another, comprising:

an assembly including a first sensor component movable with respect to a second sensor component;

means for attaching said first sensor component to one of said relatively movable suspension members and said second sensor component to the other of said relatively movable suspension members such that said first and second sensor components will be caused to move with respect to one another when said suspension members move with respect to one another;

signal generation means associated with said first and second sensor components for sequentially generating a plurality of position signals including both unique and non-unique signals as said suspension moves from either the jounce or rebound position to the other position.

2. A sensor for determining the operational position of an automotive suspension including two suspension members relatively movable with respect to one another, comprising:

an assembly including a first sensor component movable with respect to a second sensor component;

means for attaching said first sensor component to one of said relatively movable suspension members and said second sensor component to the other of said relatively movable suspension members such that said first and second sensor components will be caused to move with respect to one another when said suspension members move with respect to one another;

magnet means carried by said first sensor component for generating a plurality of interrupted magnetic fields, with said magnetic fields extending along a portion of said first sensor component; and detector means including a plurality of spaced apart detector devices carried by said second sensor component and responsive to said interrupted magnetic fields for generating a sequence of unique and non-unique position signals representative of the position between said two suspension members, with each of said detector devices constructed so as to generate a first logic signal at one level whenever said detector is in proximity to the field produced by said magnet means and a second logic signal at another level whenever said detector is in proximity to one of said field interruptions.

3. A sensor according to claim 2 wherein said detector devices comprise Hall effect switches.

4. A sensor according to claim 2 wherein said magnet means comprises a plurality of magnets separated by a plurality of gaps corresponding to said field interruptions.

5. A sensor according to claim 2 wherein said position signal represents whether the relative position between sad members is in any one of: (1) a trim region; (2) a high region; (3) a low region; or (4) a plurality of marker regions lying within said high and low regions, with said marker regions corresponding to said field interruptions.

6. A sensor according to claim 5 further comprising a logic device for determining which of said regions said position signal represents.

7. A sensor according to claim 6 wherein said logic device further comprises means for altering the designations of said regions so as to enable a change of the stabilized ride height of said vehicle.

8. A sensor according to claim 7 wherein said means for altering the designations of said regions comprises means for producing at least one stabilized ride height either above or below the stabilized ride height associated with said trim region.

9. A method for adjusting the ride height of a standing vehicle having an adjustable suspension unit so as to prevent the vehicle's chassis from becoming lodged upon an obstruction under said vehicle, comprising the steps of:

sensing the initial ride height of said vehicle by means of a sensor for determining the operational position of said suspension;

comparing the initial ride height to a predetermined ride height region;

generating a signal in the event that said sensed ride height is above said predetermined region;

directing said adjustable suspension unit to attempt to lower said vehicle to said predetermined region in response to said signal;

continuously sensing the adjusted ride height of the vehicle while said suspension unit attempts to lower the vehicle;

comparing the adjusted ride height to said predetermined region; and redirecting said adjustable suspension unit to make no further correction of said ride height in the event that said adjusted ride height is within said predetermined region, but redirecting said suspension unit to attempt to raise said vehicle to a greater ride height in the event that the difference between said adjusted ride height and said predetermined region is not less than the difference between said initial ride height and said predetermined region.

10. A method according to claim 9 wherein said predetermined region is a trim region of operation of said height sensor and said suspension.

11. A method according to claim 9 wherein said suspension unit is redirected to continue attempting to lower said vehicle for a predetermined time period in the event that the difference between said adjusted ride height and said predetermined region is less than the difference between said initial ride height and said predetermined region.

12. A method according to claim 9 wherein said suspension unit will be redirected to attempt to raise said vehicle by operation of said suspension unit, in a manner tending to increase ride height, for a specified period of time.

13. A method according to claim 9 wherein said suspension unit will be redirected to attempt to raise said vehicle by operation of said suspension unit, in a manner tending to increase ride height until said sensor detects a change in said ride height.

14. A sensor for determining the operational position of an automotive suspension including two suspension members relatively movable with respect to one another, comprising:

an assembly including a first sensor component rotatable with respect to a second sensor component;

means for attaching said first sensor component to one of said relatively movable suspension members and said second sensor component to the other of said relatively movable suspension members such that said first and second sensor components will be caused to rotate with respect to one another when said suspension members move with respect to one another;

magnet means carried by said first sensor component for generating a magnetic field having a plurality of field interruptions, with said magnetic field extending along a portion of said first sensor component; and detector means including a pair of spaced apart Hall effect switches carried by said second sensor component and responsive to said interrupted magnetic field for generating a sequence of unique and non-unique position signals representative of the position between said two suspension members, with each of said Hall effect switches constructed so as to generate a first logic signal at one level whenever said Hall effect switch has been rotated into proximity with the field produced by said magnet means and a second logic signal at another level whenever said Hall effect switch has been rotated into proximity with one of said field interruptions.

15. A sensor according to claim 14 wherein said magnet means comprises a plurality of magnets having a plurality of gaps there between corresponding to said field interruptions.

16. A sensor according to claim 15 wherein said first component comprises a rotor having said plurality of magnets arrayed about a portion of its outer periphery.

17. A sensor according to claim 16 wherein said rotor is rotated with respect to said Hall effect switches when said suspension members move with respect to each other.

18. A sensor according to claim 15 wherein said magnet means comprises three magnets having two gaps interposed therebetween.

19. A sensor according to claim 18 wherein said three magnets comprise one large arcuate magnet with one smaller magnet situated at either end thereof, with said gaps separating said smaller magnets from said larger magnet.

20. A sensor according to claim 5 wherein the position signal for each of said marker regions is identical.

* * * * *